United States Patent
Jones et al.

[15] 3,697,993
[45] Oct. 10, 1972

[54] AIRBORNE PULSE DOPPLER RADAR SYSTEM

[72] Inventors: William S. Jones, Baltimore; Philip S. Hacker, Silver Spring, both of Md.

[73] Assignee: Westinghouse Electric Corporation, Pittsburgh, Pa.

[22] Filed: Sept. 15, 1969

[21] Appl. No.: 857,891

[52] U.S. Cl. ............... 343/7.7, 343/17.1 R, 343/771
[51] Int. Cl. ................................................. G01s 9/42
[58] Field of Search ...... 343/7.7, 8, 17.1 R, 767, 768, 343/770, 771

[56] References Cited
UNITED STATES PATENTS 3,508,275  4/1970  Deveau et al. ............. 343/768

*Primary Examiner*—T. H. Tubbesing
*Attorney*—F. H. Henson and E. P. Klipfel

[57] ABSTRACT

An airborne pulse doppler radar system whose sidelobe clutter amplitude is minimized by providing an antenna whose main beam subtends a small angle and whose radiated energy is concentrated in the main beam and the first few sidelobes and by providing a main beam band rejection filter whose rejection band is closely matched to the antenna main beam clutter frequency band.

11 Claims, 9 Drawing Figures

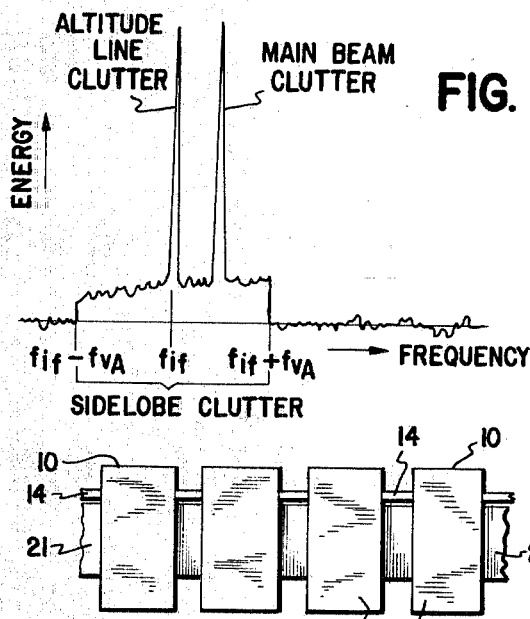
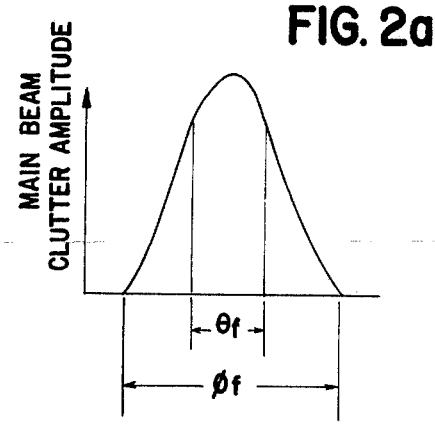
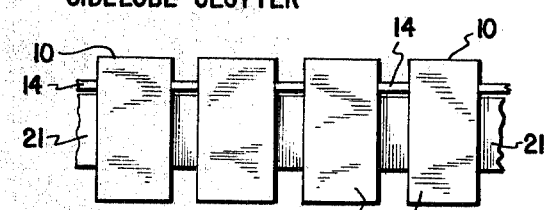
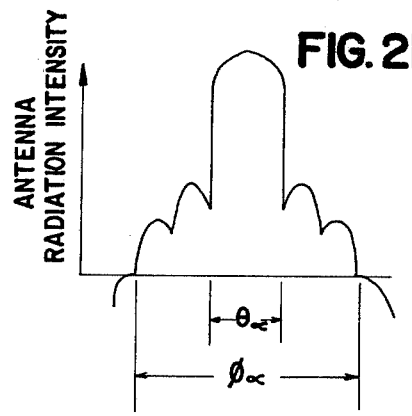
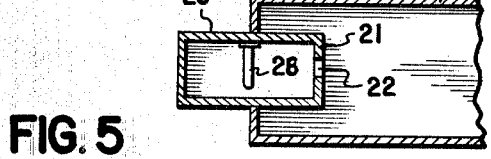
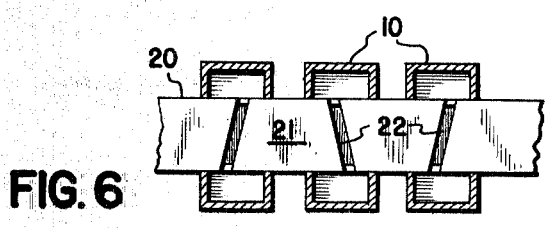
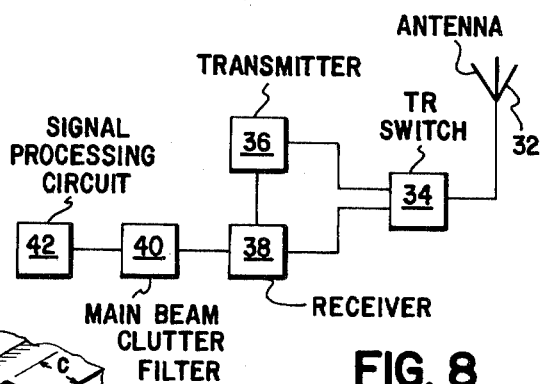
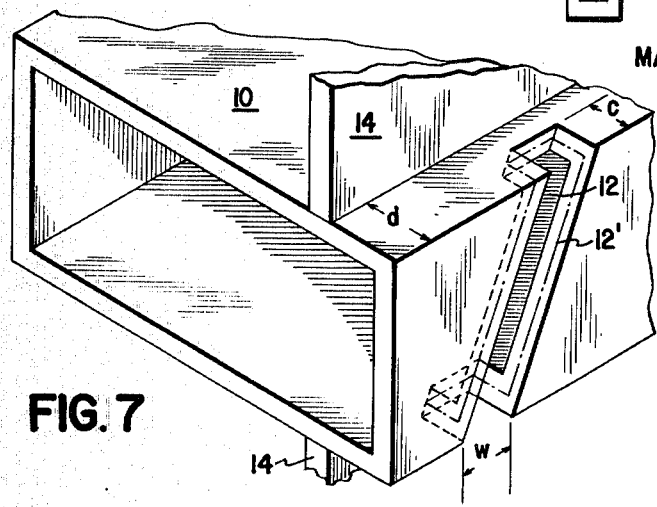
INVENTORS.
William S. Jones
Philip S. Hacker
BY Ernest P. Klipfel
ATTORNEY

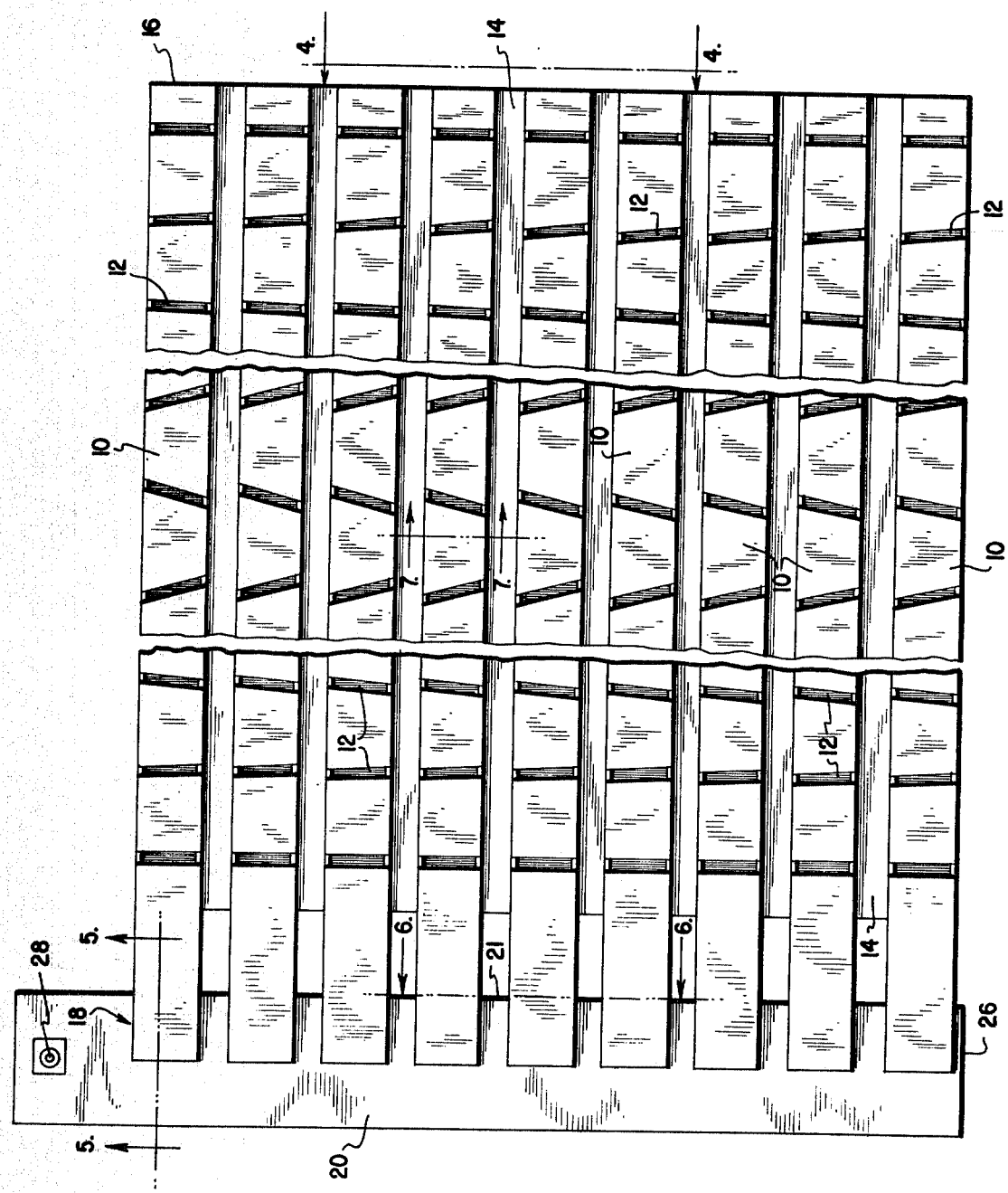

AIRBORNE PULSE DOPPLER RADAR SYSTEM

BACKGROUND OF THE INVENTION

The present invention relates to airborne radar systems, and particularly to systems of the pulse doppler type.

Pulse doppler radars have already been suggested for use, particularly by the military, in airborne systems for detecting moving targets. Such radars are particularly useful in the detection of moving targets which are closer to the ground then is the radar itself. In such situations, the radar return signal contains a substantial amount of ground return, or clutter, which must be distinguished from echoes received from moving targets.

As is well known, the received return signal resulting from each pulse transmitted by a pulse doppler radar system extends over a frequency spectrum determined by the relative velocity between the radar system and each point from which the transmitted radar pulse is reflected back to the system, the relative velocity for each such point, or more accurately locus of points, corresponding to a given doppler shift frequency. The frequency distribution of the ground return for a transmitted radar pulse is shown in FIG. 1 of the drawings. It may be seen that this ground return contains three major components: main beam clutter; altitude line clutter; and sidelobe clutter.

Altitude line clutter represents ground return from the ground region directly below the airborne radar system due to radiation produced by substantially vertical sidelobes of the antenna radiation pattern and is also due to leak through from the oscillators in the radar receiver. Since the relative velocity of the ground region directly below the radar with respect to the radar system is substantially equal to zero, altitude line clutter corresponds to a zero doppler frequency shift, i.e., it is at the intermediate frequency $f_{ij}$, created in the radar receiver. As is well known, this intermediate frequency is produced by mixing the received signal with a locally produced oscillation to place the information containing signal in a frequency range which is adapted to the frequency characteristics of the receiver circuitry.

Main beam clutter is due to the return from the relatively small region struck by the main beam of the antenna pattern and the relatively high amplitude of this clutter component is due to the fact that the energy of the transmitted radar pulse is concentrated in the main lobe of the antenna.

Finally, sidelobe clutter is due to ground return from the entire surface region. For all practical purposes, sidelobe clutter extends to the horizon in all directions and thus extends over a doppler frequency range equal to twice the doppler shift frequency corresponding to the velocity of the radar system relative to the ground, this frequency distribution being centered around $f_{ij}$, which is the zero doppler shift frequency of the system. The energy content of the sidelobe clutter is distributed substantially uniformly over this region. Outside of the sidelobe clutter region, the received signal, in the absence of a moving target, is constituted by the thermal noise inherently present in an electronic system.

The nature of these three clutter regions imparts certain performance characteristics to the pulse doppler radar device. Because of the high signal strength of the main beam clutter, no moving target can be detected at the frequencies associated with this region.

Both the width and position of the main beam clutter in the received signal spectrum are variable, primarily as functions of the velocity of the craft carrying the radar system, the angle subtended by the main beam, and the inclination of the main beam axis with respect to the velocity vector of the craft. The width of the main beam clutter is also a function of instabilities in the radar system.

Because of the magnitude of main beam clutter, it must be excluded from the received signal. For suppressing main beam clutter, a fixed frequency band rejection filter is also employed in conjunction with circuitry for controlling the position of the received signal spectrum so that the main beam clutter is always at the frequency of its associated rejection filter. This process, which is known as clutter tracking, is performed in a closed loop system so as to ensure that the main beam clutter will always be rejected.

This clutter occupies only a small doppler frequency region compared with the entire doppler frequency spectrum of the received signal. For example, the main beam clutter might have a frequency distribution corresponding to a relative velocity range of 100 knots in a total doppler frequency distribution corresponding to a velocity range of 5000 knots.

On the other hand, sidelobe clutter, which generally has a higher amplitude than inherent system noise, cannot, because of the broad frequency band over which it extends, be excluded from the portion of the received signal from which moving target information is to be extracted. Therefore, moving targets must be detected in the presence of sidelobe clutter and the amplitude of this clutter should therefore be maintained as low as possible.

SUMMARY OF THE INVENTION

It is a primary object of the present invention to substantially improve the target-detecting capabilities of such radar systems.

Another object of the invention is to substantially reduce the sidelobe clutter associated with such system.

Yet another object of the invention is to concentrate the energy radiated by the antenna of such a system in the main beam and first few near sidelobes of the antenna radiation pattern.

A further object of the invention is to match the main beam clutter rejection filter of such system to the actual main beam clutter frequency band thereof.

A still further object of the invention is to reduce the angle subtended by the main beam of such antenna while concentrating the radiated energy in the vicinity of such main beam.

These and other objects according to the invention are achieved by certain improvements in an airborne pulse doppler radar system for detecting moving targets in the presence of ground clutter and arranged to produce a pulse signal formed of a carrier wave having a given frequency and having a noise content such that the given frequency varies within predetermined limits. According to the improvements of the present invention, the system includes an antenna having a radiation lobe pattern which exhibits a narrow main beam and a concentration of radiated energy in the main beam and in the first few near sidelobes, and a main beam clutter rejection filter connected to filter the return signals received by the antenna and having a rejection frequency band substantially equal to the actual bandwidth of the main beam clutter frequency component of such return signals for a radiated signal whose carrier wave frequency varies within such predetermined limits.

The objects according to the invention are also achieved by a novel antenna for use in an airborne doppler radar system for detecting moving targets in the presence of ground clutter, the antenna having a radiation lobe pattern which exhibits a narrow main beam and a concentration of radiated energy in the main beam and in the first few near sidelobes. The antenna according to the invention is composed essentially of a plurality of parallel, rectangular, radiating wave guides each having a plurality of radiating slots formed in one narrow side wall, an input manifold connected to one end of each of the wave guides for delivering electromagnetic waves thereto, and wave launching means connected to the manifold for delivering pulse modulated radar signals thereto.

BRIEF DESCRIPTION OF THE DRAWINGS

FIG. 1 is a diagram of the ground return pattern of an airborne radar system.

FIG. 2a is a simplified diagram of the main beam clutter characteristic of an airborne radar antenna.

FIG. 2b is a simplified diagram of a portion of the radiation characteristic of such an antenna.

FIG. 3 is an elevational view of a preferred embodiment of an antenna according to the invention.

FIG. 4 is an end view, in the direction of the arrow 4 of FIG. 3, of a portion of the antenna shown in FIG. 3.

FIG. 5 is a cross-sectional view taken along the line 5—5 of FIG. 3.

FIG. 6 is a cross-sectional view taken along the line 6—6 of FIG. 3.

FIG. 7 is a perspective view taken along the line 7—7 of FIG. 3.

FIG. 8 is a simplified block diagram of a radar system according to the invention.

DESCRIPTION OF THE PREFERRED EMBODIMENTS

Briefly stated, the present invention is concerned with reducing the amplitude of the sidelobe clutter component of a pulse doppler radar return signal so as to increase the sensitivity of the radar system with respect to moving targets which produce return signals in the frequency band covered by that component.

Applicants have discovered that this can be accomplished in a particularly advantageous manner by employing an antenna whose lobe pattern is such that the energy radiated by the main antenna beam, and possibly its nearest sidelobe, will be a maximum and the total energy radiated by the far sidelobes a minimum, and by matching the characteristic of the main beam clutter rejection filter to the frequency bandwidth of the main beam clutter of an antenna having such lobe pattern. It is a simple matter to design such a filter to have any desired rejection band.

Since the main beam clutter must inherently be removed from the received return signal before moving target information is derived therefrom, such increase in the energy concentrated in the main beam will have no effect on the target detecting capability of the radar system. However, the minimization of the energy radiated by the antenna sidelobes will, by reducing the amplitude of the resulting sidelobe clutter, directly improve the ability of the radar system to detect moving targets which, because of their velocity relative to the craft carrying the radar system, create a return signal whose frequency lies in the sidelobe clutter band.

Since radars of the type under consideration are intended to detect only those moving targets which are spatially located on or near the antenna axis, the minimization of the energy content of the antenna sidelobes will not reduce the moving target sensing capability in any way. In fact, such sensitivity will be increased not only by the reduction in the sidelobe clutter amplitude, but also by the increase in radiated energy along the antenna axis.

At this point it would be well to recall that a clear distinction exists between the spatial orientation and the velocity of a moving target relative to the antenna platform. The position in the overall received signal frequency spectrum of a return, or echo signal due to a moving target depends on the relative velocity of the target and not on its spatial orientation.

Thus, a moving target located directly on the antenna main beam axis would be detected by the radar system, provided that the velocity of the target relative to the system were such that the doppler frequency of the return from this target was outside of the main beam clutter rejection frequency band.

Of course, if on the other hand, the frequency of such target return were within this band, the target would not be "seen" by the radar system. However, because the velocity of a moving target relative to the radar system is normally constantly changing, the return from any given moving target normally remains in this inherent radar system "blind spot" for only a brief period of time.

As has been noted earlier, the spectral width, or frequency band, of main beam clutter is determined by the geometry and inclination of the main beam. It has been found that this spectral width is also strongly dependent on the frequency stability of the oscillator producing the carrier wave which is modulated to produce the radar pulses. Variations in the frequency of this carrier wave will have a modulating effect which inevitably increases the spectral width of the main beam clutter.

It is known that such frequency variations do exist particularly in high PRF (pulse repetition frequency) pulse doppler radar systems because the stable local oscillator (STALO) producing the primary reference frequency in such a system can not be made completely stable and is normally designed on the basis of the criterion that the inherent noise content of its output be such that it will cause no spurious signals to appear in the return signal frequency region where target doppler signals are to appear. Thus, the frequency of the radar carrier wave is not perfectly constant, but just constant enough to avoid creating spurious signals in the return signal frequency spectrum.

Because the frequency of the STALO output signal can be expected to vary by a certain amount, and because this will cause the main beam clutter spectral width to be somewhat greater than the theoretical width based on a constant carrier wave frequency, it is necessary for the rejection band of the main beam clutter rejection filter to be correspondingly wider than the theoretical width. As a result, the rejection band of this filter encompasses clutter frequencies associated with the first few near sidelobes of the antenna radiation pattern as well as its main beam.

The relation between the angular distribution of the main beam and near sidelobes of an antenna and the actual main beam clutter band is shown in FIGS. 2a and 2b. FIG. 2a shows the intensity of main beam clutter as a function of frequency with respect to the clutter frequency associated with the main beam axis. FIG. 2b shows the antenna radiation pattern as a function of the angular displacement from the main beam axis.

Since a given ground return doppler frequency, or clutter frequency, is associated with each angular displacement from the main beam axis, it can be considered that each point along the frequency abscissa of FIG. 2a corresponds to a similarly spaced point along the angular inclination abscissa of FIG. 2b. Thus, the clutter frequency band $\theta_f$ of FIG. 2a represents the theoretical main beam clutter spectral width, while the angular spread $\theta_a$ of FIG. 2b represents the spatial angle subtended by the main beam. Similarly, $\phi_f$ of FIG. 2a represents the actual main beam spectral width due to the inherent STALO instability, while $\phi_a$ represent the corresponding portion of the antenna radiation pattern. In other words, $\phi_f$ represents the spectral width of the clutter associated with a spatial radiation angle of $\phi_a$, each specific clutter frequency being considered to correspond to a particular energy radiation angle, based on the assumption that the radar signal carrier wave is at its intended, or nominal, frequency.

FIGS. 2a and 2b readily reveal that the actual main beam clutter includes frequencies nominally associated with clutter due to radiation in the first few sidelobes of the antenna pattern. It thus results that if, according to the invention, the main beam rejection filter is designed to block the actual main beam clutter spectrum $\phi_f$, effective use can be made of a special antenna which concentrates radiated energy in the main beam and first few sidelobes at the expense of the energy radiated by the far sidelobes with the advantage that sidelobe clutter will be substantially reduced without increasing the spectral width of the main beam clutter.

A further significant advantage is that the concentration of energy in the antenna main beam will substantially increase the sensitivity of the system to moving targets in the direction of the main beam, i.e., moving targets spatially located near the main beam axis but having a velocity relative to the radar which produces a doppler frequency return outside of the main beam clutter band.

A preferred embodiment of an antenna for the radar system according to the invention is shown in FIGS. 3 to 7.

FIG. 3 shows the general arrangement of the antenna as being rectangular, the antenna thus presenting what is generally known as a "rectangular aperture." However, the antenna could also be configured to present a substantially circular or elliptical aperture.

The antenna is basically composed of a set of parallel, horizontally extending radiating waveguides 10 each having a series of alternately angled radiating slots 12 cut into one of its narrow side walls. Each slot is inclined in the opposite direction from its adjacent slots and the angle formed by each slot with the vertical decreases progressively from the center to the ends of the guide. Between adjacent waveguides 10 are disposed plates 14 extending along the length of the waveguides at least over the regions occupied by the slots 12. These plates are spaced an accurately determined distance back from the narrow side walls containing slots 12. The plates 14 create controlled depth choke grooves between the waveguides to suppress cross polarized energy which would otherwise appear, when the antenna is excited, due to the fact that adjacent slots are angled in opposite directions.

Each waveguide 10 has one end 16 terminated in a short circuit, which may be effected simply by making the end closed, and its other end 18 connected to an input manifold constituted by a waveguide 20. One narrow wall 21 of waveguide 20 traverses waveguides 10 and is provided with alternately angled radiating slots 22, shown in FIGS. 5 and 6, which constitute coupling slots for feeding energy into guides 10. There is one slot 22 for each guide 10 and the totality of slots 22 is arranged in a manner identical with the slots 12 of each of the guides 10. The distance between a slot 22 and the first slot 12 of its associated radiating guide must be at least one-half of the guide wavelength. The only effect of a greater distance is to increase the antenna dimensions and to slightly increase attenuation.

One end 26 of guide 20 is terminated in a short circuit, by making the end closed, while the other end is also closed and is provided with a suitable wave launching system 28 which could be constituted by a transverse probe connectable to the center conductor of a coaxial signal input conductor. The spacing between probe 28 and the first slot 22 of guide 20 is determined in the same manner as that set forth above with regard to the spacing between each slot 22 and the first slot 12 of its associated waveguide 10.

The end view of FIG. 4, taken in the direction of the arrow 4 of FIG. 3, shows the relation of the plates 14 to the radiating walls of waveguides 10. FIG. 4 also shows that input manifold 20 is disposed midway between the narrow side walls of waveguides 10.

FIG. 5 shows that the end 18 of each waveguide 10 has the form of a T waveguide arm connected directly to the main portion of its associated radiating guide 10.

FIG. 6 shows the alternately angled arrangement of slots 22 of waveguide 20. The guides 10 are spaced apart by an amount which permits the slots 22 to be properly spaced from one another while enabling each slot 22 to be centered with respect to the lateral walls of its associated waveguide 10. In order for the radiation produced by the antenna to have the desired pattern, and in particular the desired narrow, concentrated main lobe, the slots 12 and 22 must have precisely controlled dimensions and spacing, both from one another and from the ends of their waveguides.

The individual slotted arrays are designed to be resonant primarily because this permits an exact equivalent circuit to be determined. In fact, this equivalent circuit is, in conjunction with mutual coupling computations involving thin slotted radiators, a key to the achievement of low sidelobe radiation according to the invention.

For resonance to occur, the slots 12 and 22 must be spaced from one another by exactly one-half of the guide wavelength, i.e., one-half the wavelength, in the guide, of the wave being propagated. In addition, the short-circuit termination 16 of waveguide 10 and the corresponding termination 26 of guide 20 must be exactly one-quarter of the guide wavelength from the center of the last slot of its associated guide.

In theory, it is desirable that each individual slot be resonant, this condition existing when the circumference of each slot is exactly equal to the guide wavelength. The circumference of the slot is the length of a closed path extending along the midline of each slot wall and is represented in FIG. 7 by the dot-dash line 12'. However, in order to compensate for mutual coupling effects between the slots, and to create low reactance values, each slot is preferably cut so as to be slightly off resonance. This can be accomplished by controlling the depth $c$ to which the slot is cut into the top and bottom walls, i.e., the wide lateral walls of each of the waveguides 10 and 20. This depth should be carefully selected since the influence of inaccuracies therein on the slot characteristic will be proportional to the inaccuracy multiplied by the Q of the slot, which is typically 12–15 for narrow slots. The exact depth $c$ of cut can be determined experimentally or mathematically after the other slot dimensions have been selected.

It will be appreciated that once the general configuration of the guide has been determined and the general slot arrangement selected, the precise dimensions of the slots and the waveguides, and the precise manner in which the slot inclination varies along each waveguide, can be determined either analytically or experimentally according to well-known techniques. One specific example will now be given for an antenna to be used with a radar system employing a carrier wave frequency of 9.6 GHz, energy being propagated in the waveguides 10 and 20 in the $TE_{1,0}$ mode.

For this particular case, the antenna could be composed of a total of nine waveguides 10, with each waveguide 10 being provided with 27 slots 12. The inclination of the slots to the vertical varies along the length of each waveguide from a maximum of 15° at the middle of the guide to a minimum of 1° or 2° at the ends of the guide. A good radiation pattern would be obtained if the slot inclination varied along the guide in a linear manner. However, in order to optimize the antenna characteristics it would be necessary for the slot inclination to vary from one slot to the next in a manner which deviates somewhat from a linear relationship. The precise relationship can be determined in accordance with known analytical techniques which, although complex, are straight forward. The approximate inclination $\theta$ of each slot can be represented by the law $g = K \sin_2 \theta$, where $g$ is the slot conductance and $K$ is an experimentally determined constant dependent on slot and waveguide parameters. This angle can be adjusted slightly to compensate for conductance perturbations due to mutual coupling between all of the antenna elements.

The waveguides 10 and 20 can have transverse dimensions of 1.250 by 0.625 inches and a wall thickness of 0.062 inches. The slots 12 and 22 are spaced along their respective waveguides with a separation of 0.834 inches between slot centers. The width $w$, indicated in FIG. 7, of each slot is not highly critical and can have a value of the order of one-sixteenth of an inch. After the precise resulting dimensions of each slot have been determined, the depth $c$ to which the slot should be cut into the wide lateral walls of the waveguide is determined. As an example, a slot near one end of the waveguide, i.e., a slot having a small inclination with respect to the vertical, could be cut into the wide lateral walls to a distance of 0.126 inches. In order to optimize the performance of the resulting antenna, the slot dimensions and spacing, as well as the inside dimensions of the waveqides, must be precise.

The depth $d$ of the choke groove extending between the front narrow wall of each waveguide 10 and its associated plates 14, as shown in FIG. 7, must also be precisely adjusted. The exact depth $d$ required is represented by the equation:

$$d = \frac{.26\lambda s}{\sqrt{4s^2 - \lambda^2}}$$

where $\lambda$ is the free space wavelength of the wave being propagated in the guide and $s$ is the spacing between adjacent waveguide slots. By way of example, the depth $d$ could have a value of the order of 0.28 inches.

As has already been mentioned, the input manifold guide 20 is spaced midway between the wide lateral side walls of waveguides 10. In addition, the end wall of the end 18 of each waveguide 10 is disposed so as to bisect the guide 20. The guide 20 is oriented so that its longitudinal axis is perpendicular to the longitudinal axes of the guides 10 and so that its narrow lateral dimension is perpendicular to the narrow lateral dimension of each of the guides 10. The slots 22 in guide 20 are alternately angled and spaced from one another in precisely the same manner as the slots 12 of guides 10. In addition, the dimensions of each slot 22 are the same as those of corresponding slots 12. Since waveguide 20 contains only nine slots, one for each of the waveguides 10, the manner in which the inclination of the slots 22 varies from one slot to the next will be somewhat different from that for the slots 12 of each of the waveguides 10. However, the general nature of this variation will be the same and can be determined in a similar manner.

Since slots 22 are spaced one-half of the guide wavelength apart, the waveguides 10 will have to be spaced apart by the same amount, i.e., the longitudinal center lines of adjacent waveguides 10 will be one-half of the guide wavelength apart.

While the specific example described above relates to an antenna having a total of nine radiating waveguides each provided with 27 slots, it will be readily appreciated that both the number of waveguides and the number of slots in each guide can be varied over a certain range without substantially altering the performance of the antenna. In each case, the dimensions, inclination and spacing of the waveguide slots will be determined on the basis of the particular antenna under consideration.

Applicants have tested a waveguide identical with that described above and found that it presents a radiation lobe pattern having a main beam which subtends an angle of the order of 2° between half-power points and that the radiation intensity in the sidelobes immediately adjacent the main beam is 40 db down from that of the main beam. In addition, at an angle of approximately 24° from the antenna axis, the radiation intensity decreases to about 50 db down from the main beam radiation level.

FIG. 8 is a simplified block diagram of an airborne radar system constructed according to the invention. This system includes an antenna 32 having the from illustrated in FIGS. 3 to 7. This antenna is connected to a TR switch 34 which is in turn connected to a transmitter 36 and a receiver 38. The receiver 38 is associated with a main beam clutter filter 40 and other signal processing circuitry 42, all of these elements being well-known in the art. In accordance with the invention, the rejection frequency band of filter 40 is adjusted in the manner previously described to match the actual main beam clutter frequency described to match the actual main beam clutter frequency of the return signal, taking into account the instabilities in the frequency of the carrier wave constituting the radiated signal. The main beam clutter filter 40 can be constructed in any well-known manner and it will be appreciated that those skilled in the art would known how to design this filter to have the desired rejection frequency band once the main beam clutter characteristics and the relationship which is to exist between the main beam clutter frequency band and the rejection frequency band are known.

It will be understood that the above description of the present invention is susceptible to various modifications, changes and adaptations.

What is claimed is:

1. In an airborne pulse doppler radar system for detecting moving targets in the presence of ground clutter and arranged to produce a pulse signal formed of a carrier wave having a given frequency and having a noise content such that the given frequency varies within predetermined limits, the improvement comprising: an antenna having a plurality of parallel, rectangular waveguides having a series of radiating slots cut into one narrow sidewall, an input manifold connecting one end of each of said waveguides in parallel for delivering electromagnetic wave energy thereto, said antenna having a radiation lobe pattern which exhibits a narrow main beam and a concentration of radiated energy in the main beam and in the first few near sidelobes; and a main beam clutter rejection filter connected to filter the return signals received by said antenna and having a rejection frequency band substantially equal to the actual bandwidth of the main beam clutter frequency component of such return signals for a radiated signal whose frequency varies within such predetermined limits.

2. For use in an airborne doppler radar system for detecting moving targets in the presence of ground clutter, an antenna having a radiation lobe pattern which exhibits a narrow main beam and a concentration of radiated energy in the main beam and in the first few near sidelobes, said antenna being composed of: a plurality of parallel, rectangular, radiating waveguides each having a plurality of radiating slots formed in one narrow side wall; an input manifold connected to one end of each of said waveguides for delivering electromagnetic wave energy thereto; and wave launching means connected to said manifold for delivering pulse modulated radar signals thereto.

3. An arrangement as defined in claim 2 wherein said slots in each of said radiating waveguides are inclined in alternately opposite directions with respect to one another.

4. An arrangement as defined in claim 3 wherein, for each said radiating waveguide, the inclination of said slots varies progressively from the middle of said guide to the ends thereof.

5. An arrangement as defined in claim 4 wherein the inclination of said slots decreases progressively from the middle of said waveguide to the ends thereof with respect to the direction between the wide lateral walls of said waveguide.

6. An arrangement as defined in claim 5 wherein, for each said radiating waveguide, said slots are spaced from one another by a distance equal to one-half the wavelength, in said waveguide, of the wave being propagated, and said waveguide is provided with a short-circuit termination at its other end spaced one-quarter of the guide wavelength from the last one of said slots.

7. An arrangement as defined in claim 2 wherein said input manifold is constituted by a rectangular waveguide having the same transverse dimensions as each of said radiating waveguides and provided with a plurality of coupling slots each communicating with a respective one of said radiating waveguides.

8. An arrangement as defined in claim 7 wherein said coupling slots are inclined in alternately opposite directions with respect to one another.

9. An arrangement as defined in claim 8 wherein said coupling slots are spaced from one another by a distance equal to one-half the wavelength, in said input manifold waveguide, of the wave being propagated, and each said coupling slot is centered on the longitudinal axis of its associated radiating guide.

10. An arrangement as defined in claim 2 wherein each of said radiating slots is cut to a predetermined depth into the wide lateral walls of its associated waveguide.

11. An arrangement as defined in claim 2 further comprising plate means disposed between each adjacent pair of said radiating waveguides and extending substantially along the length of the radiating portion of said guides, said plate means being set in from said narrow waveguide side walls in which said slots are formed to define choke grooves having an accurately determined depth.

* * * * *